(12) United States Patent
Song

(10) Patent No.: US 11,472,492 B2
(45) Date of Patent: Oct. 18, 2022

(54) FRAME JOINT STRUCTURE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/324,878

(22) Filed: May 19, 2021

(65) Prior Publication Data

US 2022/0135141 A1 May 5, 2022

(30) Foreign Application Priority Data

Nov. 3, 2020 (KR) .................. 10-2020-0145013

(51) Int. Cl.
*B62D 27/02* (2006.01)
*B62D 23/00* (2006.01)

(52) U.S. Cl.
CPC .......... *B62D 27/023* (2013.01); *B62D 23/005* (2013.01)

(58) Field of Classification Search
CPC ... B62D 27/023; B62D 25/023; B62D 23/005

USPC ............................................ 296/205, 29, 30
See application file for complete search history.

(56) References Cited

U.S. PATENT DOCUMENTS 675,876 A * 6/1901 Anderson ................ B62D 7/02
280/92

FOREIGN PATENT DOCUMENTS

| CN | 202428154 U | * | 9/2012 | |
|----|-------------|---|--------|---|
| CN | 106001959 A | * | 10/2016 | |
| CN | 104554595 B | * | 6/2017 | ............ B62M 3/086 |
| CN | 111591489 A | * | 8/2020 | |

* cited by examiner

*Primary Examiner* — Dennis H Pedder
(74) *Attorney, Agent, or Firm* — Slater Matsil, LLP

(57) ABSTRACT

An embodiment frame joint structure includes a plurality of body members, each body member having opposing first and second end portions, wherein threads are formed on outer surfaces of both end portions, the threads being formed in different directions on the first end portions relative to the second end portions, and a plurality of joints, each joint having a plurality of member conjoining portions that are engageable with corresponding body members.

20 Claims, 7 Drawing Sheets

FRAME JOINT STRUCTURE

CROSS-REFERENCE TO RELATED APPLICATIONS

This application claims the benefit of Korean Patent Application No. 10-2020-0145013, filed on Nov. 3, 2020, which application is hereby incorporated herein by reference.

TECHNICAL FIELD

The disclosure relates to a frame joint structure of a vehicle.

BACKGROUND

In general, a frame is a part on which a vehicle body or various apparatuses constituting a vehicle is installed, and is a structure conceivable as a skeleton of a vehicle that supports the load transferred from the vehicle body and the reaction force of the front and rear axles.

The space frame is a type of frame that forms a skeleton (supporting structure) by welding members in the form of steel plates or hollow pipes, and has a merit of light weight and high strength, so it is applied to a vehicle body of ultra-lightweight and small-scale production.

In this space frame, the members are responsible for all the loads applied to the vehicle body, and for this reason, securing the connection robustness of the members is important.

However, if welding, adapter welding, bolting, etc. are applied to the outside of the member, fracture due to fatigue, impact, and torsional load may occur to cause separation of the conjoining portions between the members.

The above information disclosed in this Background section is only for enhancement of understanding of the background of the invention, and therefore it may contain information that does not form the prior art that is already known to a person of ordinary skill in the art.

SUMMARY

The disclosure relates to a frame joint structure of a vehicle. Particular embodiments relate to a joint structure of a space frame for a vehicle.

An exemplary frame joint structure includes a plurality of body members having threads formed in different directions on outer surfaces of both end portions, and a plurality of joints each having a plurality of member conjoining portions that are screw-engageable with corresponding body members.

Each of the plurality of body members may be disposed along a corresponding direction among a plurality of axis directions including a vehicle length direction, a vehicle width direction, and a vertical direction.

Each of the plurality of joints may be configured to conjoin corresponding body members through the plurality of member conjoining portions protruding in directions of the corresponding body members.

The body members and the member conjoining portions may be formed in circular cross-sections.

The body member may include a first male threaded portion formed on an outer surface of a first end portion, and a second male threaded portion formed on an outer surface of a second end portion where a thread direction of the second male threaded portion is opposite to a thread direction of the first male threaded portion.

The joint may include a first female threaded portion formed on an inner surface of a member conjoining portion screw-engaged with the first male threaded portion, and a second female threaded portion formed on an inner surface of a member conjoining portion screw-engaged with the second male threaded portion, in a tread direction opposite to a thread direction of the first female threaded portion.

The first and second male threaded portions may be screw-engaged with the first and second female threaded portions, in active engagement ranges with extra thread ranges.

The body member may further include a guide portion in a tapered shape that is respectively formed at the first and second male threaded portions of the body member.

Ranges of the first and second male threaded portions of the body member may be formed along a same axis, and a range between the first and second male threaded portions may be formed in a straight line.

Ranges of the first and second male threaded portions of the body member may be formed along a same axis, and a range between the first and second male threaded portions may be formed in a curved line.

According to an exemplary embodiment, body members having the same closed cross-sections are conjoined through entire surface matching, such that conjoining strength and torsional strength of the entire space frame may be increased.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

The drawings are intended to be used as references for describing the exemplary embodiments of the present invention, and the accompanying drawings should not be construed as limiting the technical spirit of the present invention.

Figure 1:
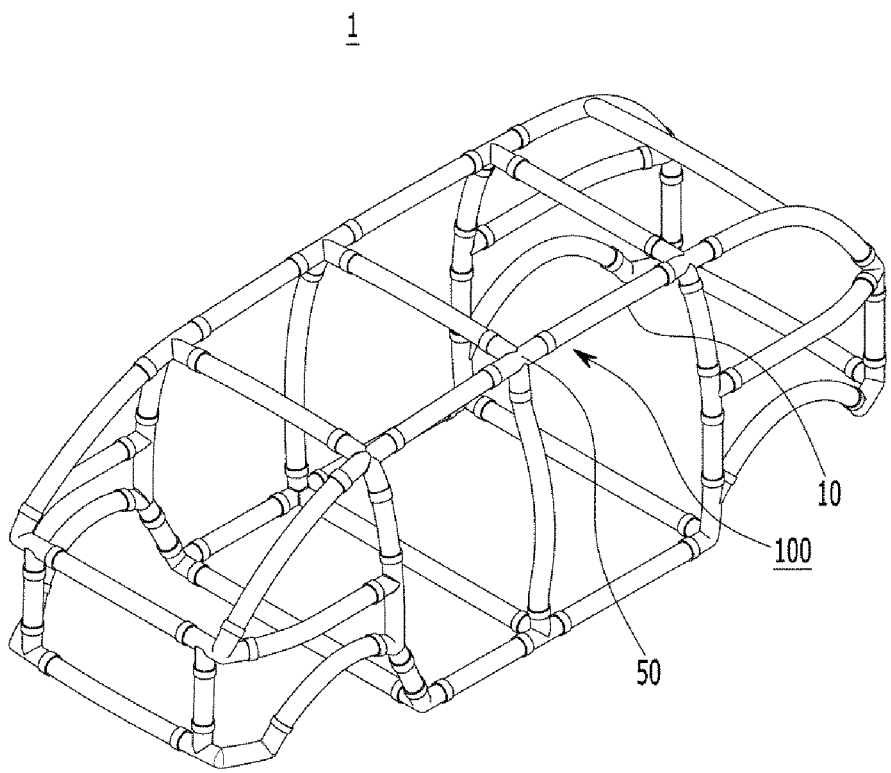
FIG. 1 is a perspective view of a space frame as a vehicle body to which a frame joint structure according to an exemplary embodiment may be applicable.

The following elements may be used in connection with the drawings to describe embodiments of the present invention.

1: space frame
10: body member
11: first male threaded portion
12: second male threaded portion
15: extra thread range 19: guide portion
50: joint
51: member conjoining portion
61: first female threaded portion
62: second female threaded portion
65: active engagement range
O: axis
S1: first range
S2: second range
100: frame joint structure

DETAILED DESCRIPTION OF ILLUSTRATIVE EMBODIMENTS

Hereinafter, embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify embodiments of the present invention, parts that are not related to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited.

In addition, unless explicitly described to the contrary, the word "comprise" and variations such as "comprises" or "comprising", will be understood to imply the inclusion of stated elements but not the exclusion of any other elements.

Furthermore, each of terms, such as " . . . unit", " . . . means", " . . . part", and " . . . member" described in the specification, mean a unit of a comprehensive element that performs at least one function or operation.

FIG. 1 is a perspective view of a space frame as a vehicle body to which a frame joint structure according to an exemplary embodiment may be applicable.

Referring to FIG. 1, a frame joint structure 100 according to an exemplary embodiment may be applied to, for example, a purpose built vehicle (PBV) such as an unmanned vehicle.

Such a PBV vehicle may include, as a chassis, an underbody of a skateboard type, and an upper body as a vehicle body mounted on the underbody.

In addition, the upper body may be a space frame 1 forming a skeleton by connecting steel plates or pipes. In addition, the frame joint structure 100 according to an exemplary embodiment may be applied to the joint structure of the space frame 1 formed by conjoining a plurality of vehicle body component parts.

Here, the space frame 1 may include an underframe disposed at a bottom side of the space frame 1, an upper frame disposed at a top side of the space frame 1, and a side frame vertically interconnecting the underframe and the upper frame.

However, the scope of the present invention is not necessarily limited thereto, and the spirit of the present disclosure may be applied to a frame joint structure of various configurations conjoining a plurality of vehicle body component parts.

In addition, hereinafter, an "end (one end, another end, and the like)" may be defined as any one end or may be defined as a portion (one end portion, another end portion, and the like) including that end.

In an exemplary embodiment, vehicle body members (hereinafter, called body members) having closed cross-sections are conjoined through entire surface matching, such that conjoining strength and torsional strength may be increased.

Figure 2:
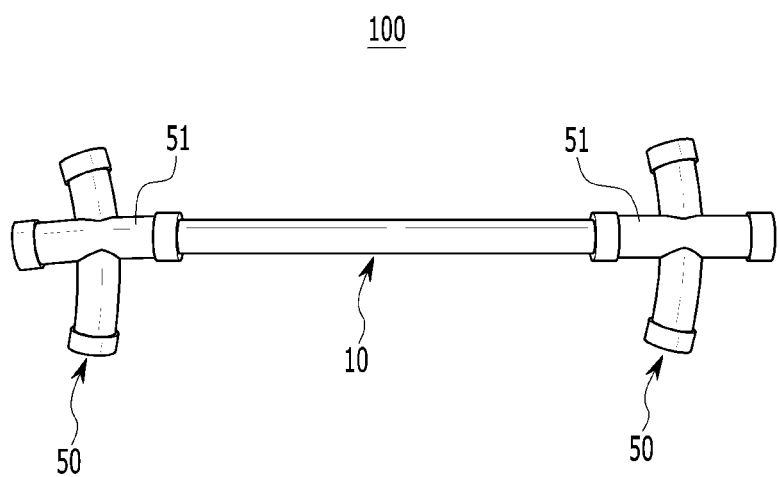
FIG. 2 is a perspective view of a frame joint structure according to an exemplary embodiment.
Figure 3:
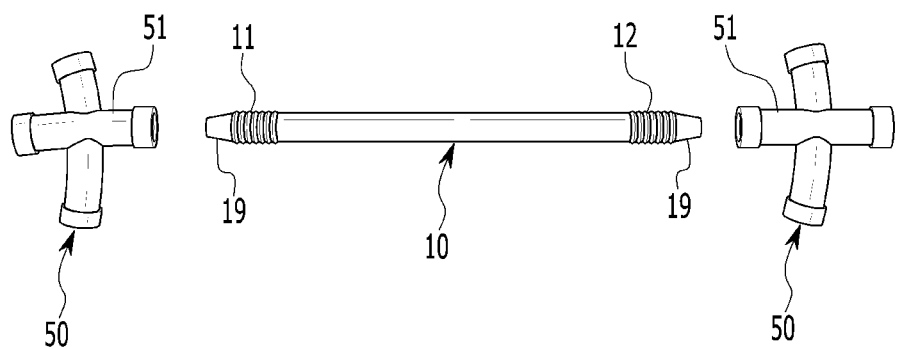
FIG. 3 is an exploded perspective view of a frame joint structure according to an exemplary embodiment.

FIG. 2 is a perspective view of a frame joint structure according to an exemplary embodiment, and FIG. 3 is an exploded perspective view of a frame joint structure according to an exemplary embodiment.

Referring to FIG. 1 to FIG. 3, a frame joint structure 100 according to an exemplary embodiment includes a plurality of body members 10 and a plurality of joints 50.

In an exemplary embodiment, the body members 10 are vehicle body members forming the space frame 1. The underframe, the upper frame, and the side frame of the space frame 1 may be formed by conjoining the body members 10 through the joints 50.

The body members 10 may be disposed along a plurality of axis directions including a vehicle length direction, a vehicle width direction, and a vertical direction. Each body member 10 may form threaded portions 11 and 12 on outer surfaces of opposite end portions. The threaded portions 11 and 12 may be formed in different thread directions. Here, the body members 10 may be formed in a predetermined shape and length, and may be provided as a hollow pipe having a circular cross-section.

The body member 10 may include a first male threaded portion 11 formed on an outer surface of a first end portion, and a second male threaded portion 12 formed on an outer surface of a second end portion where a thread direction of the second male threaded portion 12 is opposite to a thread direction of the first male threaded portion 11.

In an exemplary embodiment, the joints 50 are configured to interconnect the body members 10. The joint 50 includes a plurality of member conjoining portions 51 that are screw-engageable with end portions of the body members 10. The member conjoining portions 51 may be integrally formed in the joint 50, and may protrude in a plurality of axis directions including a vehicle length direction, a vehicle width direction, and a vertical direction, depending on the joints 50. Here, each member conjoining portion 51 is provided as a cylindrical hollow pipe of a predetermined length having a circular cross-section.

Figure 4:
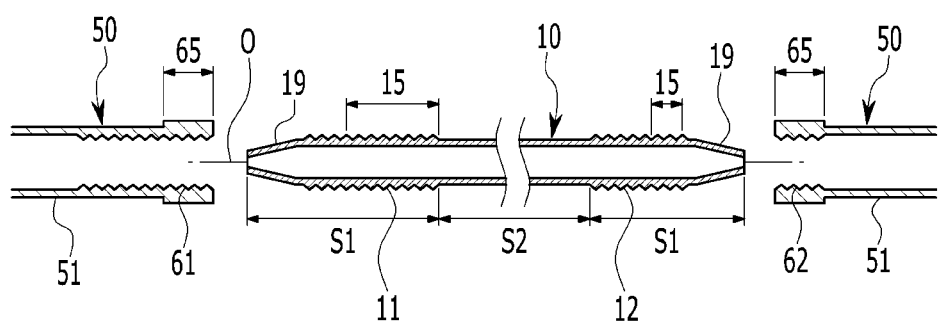
FIG. 4 is a cross-sectional view of a body member and a joint applied to a frame joint structure according to an exemplary embodiment.

The configurations of the body member 10 and the joint 50 are hereinafter described in further detail with reference to FIG. 4. The body member 10 includes two first ranges S1 formed with the first and second male threaded portions 11 and 12, respectively, and a second range S2 between the first and second male threaded portions 11 and 12. The first ranges S1 and the second range S2 are interconnected along a same axis to form the body member 10 in a generally linear form.

The joint 50 includes a first female threaded portion 61 formed on an inner surface of the member conjoining portion 51 screw-engaged with the first male threaded portion 11 of the body member 10. In addition, the joint 50 includes a second female threaded portion 62 formed on an inner surface of the member conjoining portion 51 screw-engaged with the second male threaded portion 12 of the body member 10. The second female threaded portion 62 is formed in a thread direction opposite to the thread direction of the first female threaded portion 61.

Here, the first and second male threaded portions 11 and 12 may be screw-engaged with the first and second female threaded portions 61 and 62, in active engagement ranges 65 with extra thread ranges 15.

Furthermore, the body member 10 includes a guide portion 19 in a tapered shape that is respectively formed at the first and second male threaded portions 11 and 12 of the body member 10.

Hereinafter, a process of assembling a frame joint structure 100 according to an exemplary embodiment is described in detail with reference to the accompanying drawings.

Figure 5:
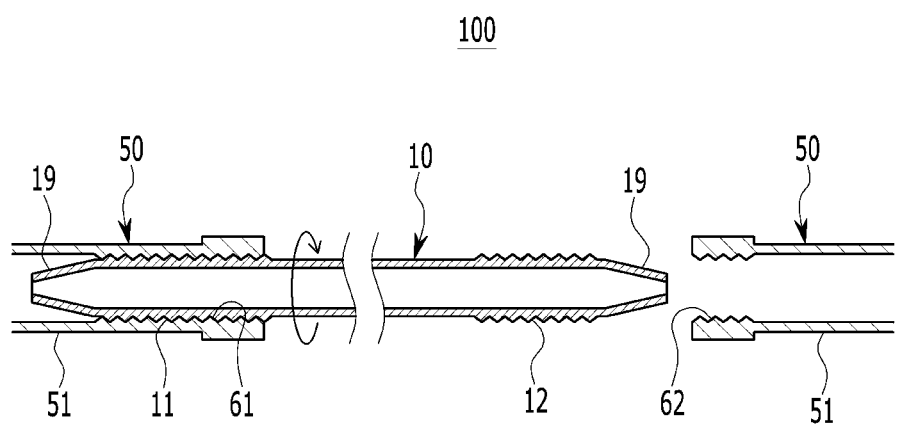
FIG. 5 and FIG. 6 illustrate a process of assembling a frame joint structure according to an exemplary embodiment.
Figure 6:
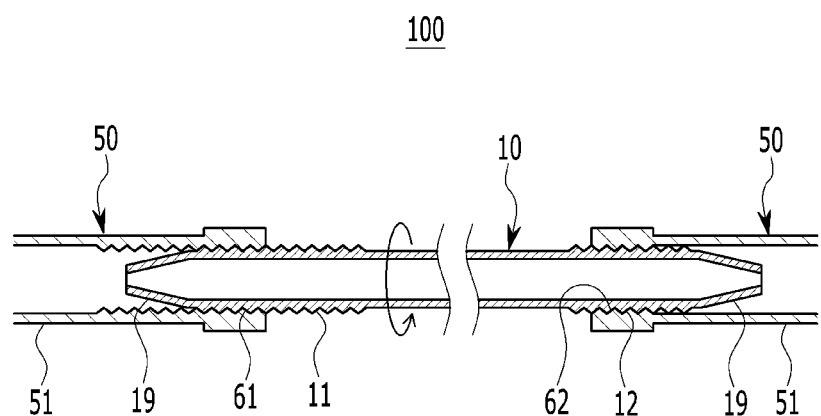

FIG. 5 and FIG. 6 illustrate a process of assembling a frame joint structure according to an exemplary embodiment.

Referring to FIG. 5, in an exemplary embodiment, a first end portion (i.e., the left end portion) of the body member 10 is preliminarily engaged with the member conjoining portion 51 of the joint 50 shown in the left.

In this case, the first end portion of the body member 10 is inserted into the member conjoining portion 51 through the guide portion 19, and then the body member 10 is rotated in a first direction shown in FIG. 5. Then, the body member 10 is preliminarily engaged with the first female threaded portion 61 of the member conjoining portion 51 through the extra thread range 15 of the first male threaded portion 11.

Accordingly, in an exemplary embodiment, a space for receiving a second end portion (i.e., the right side end portion) of the body member 10 may be secured in front of the member conjoining portion 51 of the joint 50 shown in the right.

Subsequently, in an exemplary embodiment, as shown in FIG. 6, the body member 10 is rotated in a second direction shown in FIG. 6, which is opposite to the arrow direction shown in FIG. 5. Then, the body member 10 is slightly released from the first female threaded portion 61 of the member conjoining portion 51 through the first male threaded portion 11. Then, the first end portion of the body member 10 is actively engaged with the active engagement ranges 65 of the first female threaded portion 61 through the first male threaded portion 11.

Simultaneously, the second end portion of the body member 10 is inserted into the member conjoining portion 51 of the joint 50 shown in the right through the guide portion 19, and is actively engaged with the active engagement ranges 65 of the second female threaded portion 62 through the second male threaded portion 12, at the member conjoining portion 51.

Here, in an exemplary embodiment, according to the extra thread ranges 15 of the first and second male threaded portions 11 and 12, the loosening direction of the body member 10 at the left joint 50 is the same as the fastening direction of the body member 10 at the right joint 50.

Therefore, in an exemplary embodiment, loosening of the body member 10 with respect to the left joint 50 and the right joint 50 is prevented, and the body member 10 may be maintained to be normally engaged with the active engagement ranges 65 of the first and second female threaded portions 61 and 62 of the joints 50 through the first and second male threaded portions 11 and 12.

According to a frame joint structure 100 according to an exemplary embodiment, the body member 10 may be screw-engaged with the joints 50 through the threaded portions 11 and 12 having opposite thread directions formed on both end portions of the body member 10.

Therefore, in an exemplary embodiment, conjoining strength and torsional strength of the entire space frame 1 may be increased through the entire surface matching of the body members 10 having the same shaped closed cross-sections. That is, in an exemplary embodiment, fracture due to fatigue, impact, and torsional load may be prevented to prevent separation of the conjoining portions between the body members 10.

In addition, in an exemplary embodiment, the body members 10 and the joints 50 are interconnected through male and female threads having different thread directions, and loosening of the body members 10 may be prevented.

In addition, in an exemplary embodiment, the body members 10 may be interconnected by using the complete circumference of the cross-section through thread engagement, and frames of various specification and style may be easily implemented.

Furthermore, in an exemplary embodiment, since auxiliary materials or welding equipment to interconnect the body members 10 are not required in addition to the joints 50, frame manufacturing man-hours and manufacturing cost may be reduced.

Figure 7:
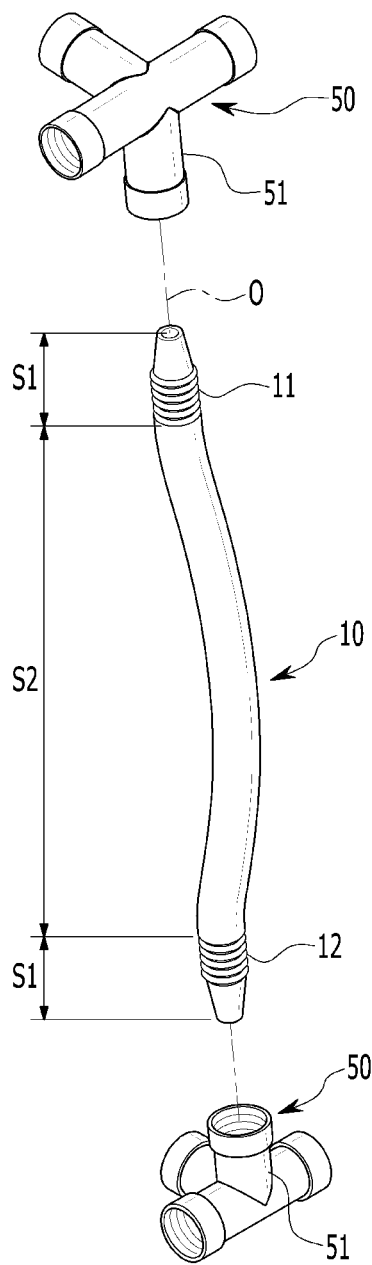
FIG. 7 illustrates an exemplary variation of a body member applied to a frame joint structure according to an exemplary embodiment.

FIG. 7 illustrates an exemplary variation of a body member applied to a frame joint structure according to an exemplary embodiment.

Referring to FIG. 7, in the body member 10 according to the variation, the two first ranges S1 respectively formed with the first and second male threaded portions 11 and 12 are formed along the same axis O, and the second range S2 between the first and second male threaded portions 11 and 12 may be provided in a curved line.

That is, a curved line profile is applied to the body member 10, and such body member 10 may be engaged with the member conjoining portions 51 of the joints 50 through the first and second male threaded portions 11 and 12 even if the profile of the body member 10 is not linear. It may be understood that the axis O may be formed oblique and the various overall form of the frame may be easily obtained.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A frame joint structure, comprising:
    a plurality of tubular body members, each body member having opposing first and second end portions, wherein threads are formed on outer surfaces of both end portions, the threads being formed in different directions on the first end portions relative to the second end portions; and
    a plurality of joints, each joint having a plurality of member conjoining portions that are engageable with corresponding body members;
    wherein the frame joint structure is part of a vehicle body.

2. The frame joint structure of claim 1, wherein:
    each of the body members is disposed along a corresponding direction among a plurality of axis directions including a vehicle length direction, a vehicle width direction, and a vertical direction; and
    each of the joints is configured to conjoin corresponding body members through the member conjoining portions protruding in directions of the corresponding body members.

3. The frame joint structure of claim 1, wherein the body members and the member conjoining portions are formed in circular cross-sections.

4. The frame joint structure of claim 1, wherein the frame joint structure forms a space frame, and wherein the space frame comprises an underframe, an upper frame, and a side frame.

5. The frame joint structure of claim 1, wherein the body members comprise hollow pipes having a circular cross-section.

6. The frame joint structure of claim 1, wherein each of the body members is tapered at each end portion.

7. A frame joint structure, comprising:
a plurality of tubular body members each having a first male threaded portion formed on an outer surface of a first end portion, and a second male threaded portion formed on an outer surface of a second end portion, wherein a thread direction of the second male threaded portion is opposite to a thread direction of the first male threaded portion; and
a plurality of joints each having a plurality of member conjoining portions that are screw-engageable with corresponding body members;
wherein the frame joint structure is part of a vehicle body.

8. The frame joint structure of claim 7, wherein each of the joints comprises:
a first female threaded portion formed on an inner surface of a member conjoining portion screw-engaged with the first male threaded portion; and
a second female threaded portion formed on an inner surface of a member conjoining portion screw-engaged with the second male threaded portion, in a thread direction opposite to a thread direction of the first female threaded portion.

9. The frame joint structure of claim 8, wherein the first and the second male threaded portions are screw-engaged with the first and the second female threaded portions in active engagement ranges with extra thread ranges.

10. The frame joint structure of claim 7, wherein each of the body members further comprises a guide portion in a tapered shape that is respectively formed at the first and second male threaded portions of the body members.

11. The frame joint structure of claim 7, wherein:
ranges of the first and the second male threaded portions of the body members are formed along a same axis; and
a range between the first and the second male threaded portions is formed in a straight line.

12. The frame joint structure of claim 7, wherein:
ranges of the first and the second male threaded portions of the body members are formed along a same axis; and
a range between the first and the second male threaded portions is formed in a curved line.

13. A vehicle body comprising:
an underbody; and
an upper body mounted on the underbody, the upper body comprising:
a plurality of tubular body members each having a first male threaded portion formed on an outer surface of a first end portion, and a second male threaded portion formed on an outer surface of a second end portion, wherein a thread direction of the second male threaded portion is opposite to a thread direction of the first male threaded portion; and
a plurality of joints each having a plurality of member conjoining portions screw-engaged with corresponding body members.

14. The vehicle body of claim 13, wherein:
each of the body members is disposed along a corresponding direction among a plurality of axis directions including a vehicle length direction, a vehicle width direction, and a vertical direction; and
each of the joints is configured to conjoin corresponding body members through the member conjoining portions protruding in directions of the corresponding body members.

15. The vehicle body of claim 13, wherein the body members and the member conjoining portions are formed in circular cross-sections.

16. The vehicle body of claim 13, wherein each of the body members is tapered at each end portion.

17. The vehicle body of claim 13, wherein each of the joints comprises:
a first female threaded portion formed on an inner surface of a member conjoining portion screw-engaged with the first male threaded portion; and
a second female threaded portion formed on an inner surface of a member conjoining portion screw-engaged with the second male threaded portion, in a thread direction opposite to a thread direction of the first female threaded portion.

18. The vehicle body of claim 17, wherein the first and the second male threaded portions are screw-engaged with the first and the second female threaded portions in active engagement ranges with extra thread ranges.

19. The vehicle body of claim 13, wherein:
ranges of the first and the second male threaded portions of the body members are formed along a same axis; and
a range between the first and the second male threaded portions is formed in a straight line.

20. The vehicle body of claim 13, wherein:
ranges of the first and the second male threaded portions of the body members are formed along a same axis; and
a range between the first and second male threaded portions is formed in a curved line.

* * * * *